United States Patent
Sung (10) Patent No.: US 9,582,765 B2
(45) Date of Patent: Feb. 28, 2017

(54) APPARATUS, METHOD, AND NON-TRANSITORY COMPUTER READABLE STORAGE MEDIUM THEREOF FOR RECOMMENDING AN ELECTRICITY CONSUMPTION BEHAVIOR

(71) Applicant: Institute For Information Industry, Taipei (TW)

(72) Inventor: Jing-Tian Sung, Taipei (TW)

(73) Assignee: Institute For Information Industry, Taipei (TW)

( * ) Notice: Subject to any disclaimer, the term of this patent is extended or adjusted under 35 U.S.C. 154(b) by 423 days.

(21) Appl. No.: 14/099,316

(22) Filed: Dec. 6, 2013

(65) Prior Publication Data
US 2015/0142722 A1    May 21, 2015

(30) Foreign Application Priority Data

Nov. 15, 2013  (TW) .............................. 102141621 A (51) Int. Cl.
| | | |
|---|---|---|
| *G06F 9/44* | (2006.01) | |
| *G06N 7/02* | (2006.01) | |
| *G06N 7/06* | (2006.01) | |
| *G06N 7/00* | (2006.01) | |
| *G06N 7/04* | (2006.01) | |
| *G06N 99/00* | (2010.01) | |
| *G06N 5/04* | (2006.01) | |

(52) U.S. Cl.
CPC ................. *G06N 7/005* (2013.01); *G06N 5/04* (2013.01); *G06N 5/048* (2013.01); *G06N 7/04* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 8,046,106 | B2 * | 10/2011 | Tsai et al. .................... | 700/275 |
| 2009/0201274 | A1 * | 8/2009 | Kuwabara et al. ........... | 345/208 |
| 2011/0213739 | A1 * | 9/2011 | Benitez et al. ................ | 706/12 |

OTHER PUBLICATIONS

Residential Energy Use Behavior Change Pilot—2009 (CMFS project code B21383).*

* cited by examiner

*Primary Examiner* — Wilbert L Starks
*Assistant Examiner* — Ababacar Seck
(74) *Attorney, Agent, or Firm* — Skaar Ulbrich Macari, P.A.

(57) ABSTRACT

An apparatus, a method, and a non-transitory computer readable storage medium thereof for recommending an electricity consumption behavior are provided. The apparatus is stored with an appliance efficiency value and an electricity-consuming parameter value for each of a plurality of users. The apparatus generates a plurality of first temporary values by multiplying each of the appliance efficiency values with each of the electricity-consuming parameters, generates a power saving matrix by subtracting each of the electricity-consuming parameters from each of the electricity-consuming parameters individually, generates a changing willingness matrix by the second temporary values, calculates a transform probability matrix by the power saving matrix and the changing willingness matrix, calculates an eigenvalue and an eigenvector of the transform probability matrix, and recommends an electricity consumption behavior according to the eigenvalue and the eigenvector.

17 Claims, 3 Drawing Sheets

FIG. 2B

APPARATUS, METHOD, AND NON-TRANSITORY COMPUTER READABLE STORAGE MEDIUM THEREOF FOR RECOMMENDING AN ELECTRICITY CONSUMPTION BEHAVIOR

PRIORITY

This application claims priority to Taiwan Patent Application No. 102141621 filed on Nov. 15, 2013, which is hereby incorporated herein by reference in its entirety.

FIELD

The present invention relates to an apparatus, a method, and a non-transitory computer readable storage medium thereof for recommending an electricity consumption behavior. More particularly, the present invention relates to an apparatus, a method, and a non-transitory computer readable storage medium thereof for recommending an electricity consumption behavior according to electricity consumption habits of different users and different appliance efficiency values.

BACKGROUND

Nowadays, the problem of resource shortage has become more and more severe and at the mean time the energy prices increase continuously. Hence, energy management has become a great concern of the public. It is highly desirable to distribute and utilize the energy efficiently through intelligent monitoring, management, and control.

There are two types of energy management, which are energy management at the power-supply side and energy management at the power-consuming side. Energy management at the power-supply side achieves energy management by connecting the conventional power-supply networks and renewable energy sources to an intelligent power management network. In this way, the state of supply and demand can be monitored in real time and adjustments can be made duly to achieve the best effect. The objective of energy management at the power-supply side is to ensure the power-supply quality and to reduce costs for power grid establishing and managing. As to the objective of energy management at the power-consuming side, which places the emphasis on analyzing power consumption information in real time, predicting the future power consumption demand, and managing the power consumption in conjunction with the electricity pricing policy to avoid unnecessary waste. Through the energy management at the power-consuming side, the electricity charge can be reduced and energy saving can be achieved.

Regarding energy management at the power-consuming side, conventional technologies mainly inform users at the power-consuming side of their own electricity consumption behaviors by ranking their electricity consumptions or by holding power saving competitions. In these ways, users can make improvements on their electricity consumption behaviors to save energy. Specifically, in the case of ranking electricity consumptions of users, the power-supply side will notify a user whether his/her electricity consuming amount is too much according to his/her ranking position in terms of the electricity consumption. Thus, the user is reminded of improving his/her electricity consumption behavior to reduce the electricity consuming amount. Regarding holding power saving competition, a favorable electricity charge or other rewards will be provided to a user if his/her electricity consuming amount in this year is less than his/her electricity consuming amount in last year. Hence, electricity consumption behavior can be improved.

Although electricity consumptions of users can be reduced by ranking electricity consumptions of the users, holding power saving competitions, or other ways, the effect is not so evident. The main reason is that the conventional technologies fail in telling the users the explicit way to achieve power saving. Furthermore, users have no idea whether the high electricity consuming amount results from low appliance efficiency or from improper operations. Saving power blindly may lead to loss of due comfort and convenience, which will decrease the willingness of the users for saving energy.

Accordingly, there is still an urgent need in providing a mechanism for recommending an electricity consumption behavior which can inform a user of specific measures to save power.

SUMMARY

To solve the problem of the conventional technologies, the present invention according to certain embodiments provides an apparatus, a method, and a non-transitory computer readable storage medium thereof for recommending an electricity consumption behavior.

The apparatus for recommending an electricity consumption behavior of certain embodiments of the present invention comprises a storage unit and a processing unit, wherein the processing unit is electrically connected to the storage unit. The storage unit is stored with an appliance efficiency value and an electricity-consuming parameter value for each of a plurality of users. The processing unit is configured to generate a plurality of first temporary values by multiplying the appliance efficiency value of each of the users with the electricity-consuming parameter value of each of the users individually, generate a power saving matrix by using the first temporary values, generate a plurality of second temporary values by subtracting the electricity-consuming parameter value of each of the users from the electricity-consuming parameter value of each of the users individually, generate a changing willingness matrix by using the second temporary values, calculate a transform probability matrix by using the power saving matrix and the changing willingness matrix, calculate an eigenvalue and an eigenvector of the transform probability matrix, and recommend an electricity consumption behavior according to the eigenvalue and the eigenvector.

The method for recommending an electricity consumption behavior of certain embodiments of the present invention is implemented by a computer. The method for recommending an electricity consumption behavior comprises the following steps of: (a) generating a plurality of first temporary values by multiplying an appliance efficiency value of each of a plurality of users with an electricity-consuming parameter value of each of the users, (b) generating a power saving matrix by using the first temporary values, (c) generating a plurality of second temporary values by subtracting the electricity-consuming parameter value of each of the users from the electricity-consuming parameter value of each of the users individually, (d) generating a changing willingness matrix by using the second temporary values, (e) calculating a transform probability matrix by using the power saving matrix and the changing willingness matrix, (f) calculating an eigenvalue and an eigenvector of the transform probability matrix, and (g) recommending an electricity consumption behavior according to the eigenvalue and the eigenvector.

The non-transitory computer readable storage medium of certain embodiments of the present invention has a computer program stored therein, wherein the computer program comprises a plurality of codes. When the computer program is loaded into a computer apparatus, the codes comprised in the computer program will be executed by the computer apparatus to accomplish a method for recommending an electricity consumption behavior. The codes comprise codes A to G. The code A generates a plurality of first temporary values by multiplying an appliance efficiency value of each of a plurality of users with an electricity-consuming parameter value of each of the users. The code B generates a power saving matrix by using the first temporary values. The code C generates a plurality of second temporary values by subtracting the electricity-consuming parameter value of each of the users from the electricity-consuming parameter value of each of the users individually. The code D generates a changing willingness matrix by using the second temporary values. The code E calculates a transform probability matrix by using the power saving matrix and the changing willingness matrix. The code F calculates an eigenvalue and an eigenvector of the transform probability matrix. The code G recommends an electricity consumption behavior according to the eigenvalue and the eigenvector.

Briefly speaking, the present invention in certain embodiments calculates a power saving matrix and a changing willingness matrix by using appliance efficiency values and electricity-consuming parameter values of a plurality of users. Then, a transform probability matrix is calculated by using the power saving matrix and the changing willingness matrix. Finally, an electricity consumption behavior is recommended according to an eigenvalue and an eigenvector of the transform probability matrix. Ranking positions of all the users can be known from the eigenvalue and the eigenvector so that at least different electricity consumption behaviors are recommended to different users to tell the users how to save power by changing their electricity consumption modes.

The detailed technology and preferred embodiments implemented for the subject invention are described in the following paragraphs accompanying the appended drawings for people skilled in this field to well appreciate the features of the claimed invention.

DETAILED DESCRIPTION

The apparatus, the method, and the non-transitory computer readable storage medium thereof for recommending an electricity consumption behavior provided by certain embodiments of the present invention will be explained with reference to example embodiments thereof. However, these example embodiments are not intended to limit the present invention to any specific environment, example, embodiment, applications, or particular implementations described in these example embodiments. Therefore, description of these embodiments is only for purpose of illustration rather than to limit the present invention. It should be appreciated that in the following embodiments and the attached drawings, elements unrelated to the present invention are omitted from depiction.

Figure 1:
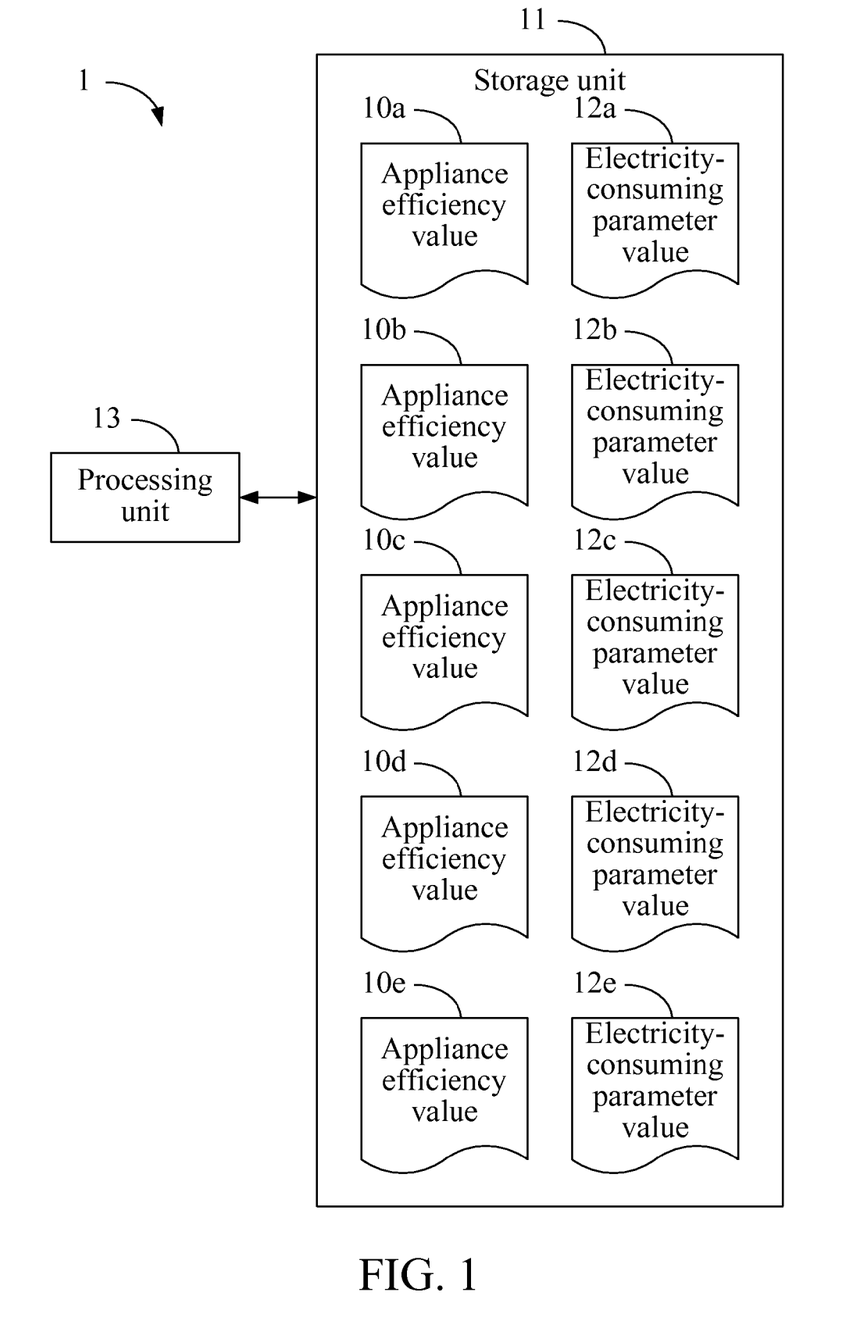
FIG. 1 is a schematic view of an apparatus for recommending an electricity consumption behavior according to a first embodiment of the present invention.

A first embodiment of the present invention is an apparatus 1 for recommending an electricity composition behavior, a schematic view of which is depicted in FIG. 1. The apparatus 1 comprises a storage unit 11 and a processing unit 13, wherein the processing unit 13 is electrically connected to the storage unit 11. The storage unit 11 may be a memory, a floppy disk, a hard disk, a compact disk (CD), a mobile disk, a magnetic tape, a database, or any other storage media or circuit with the same function and well known to those of ordinary skill in the art. The processing unit 13 may be any of various processors, central processing units (CPUs), microprocessors or other computing apparatuses known to those of ordinary skill in the art.

It is assumed that the apparatus 1 serves five users, which are a first user, a second user, a third user, a fourth user, and a fifth user. It should be appreciated that the aforesaid five users are only for the purpose of illustration rather than to limit the scope of the present invention. In other words, the present invention does not limit the number of users that the apparatus 1 can serves.

The storage unit 11 is stored with an appliance efficiency value and an electricity-consuming parameter value for each of the users. Specifically, the storage unit 11 is stored with an appliance efficiency value $10a$ and an electricity-consuming parameter value $12a$ of the first user, an appliance efficiency value $10b$ and an electricity-consuming parameter value $12b$ of the second user, an appliance efficiency value $10c$ and an electricity-consuming parameter value $12c$ of the third user, an appliance efficiency value $10d$ and an electricity-consuming parameter value $12d$ of the fourth user, and an appliance efficiency value $10e$ and an electricity-consuming parameter value $12e$ of the fifth user. It should be appreciated that the number of the appliance efficiency values and the number of the electricity-consuming parameter values stored in the storage unit 11 vary with different numbers of the users that the apparatus 1 serves.

The aforesaid appliance efficiency values $10a$, $10b$, $10c$, $10d$, and $10e$ are the efficiency values of the same type of appliance. For example, they may be all appliance efficiency values of a refrigerator. The unit of the appliance efficiency value is the consumed power divided by unit time. Furthermore, each of the electricity-consuming parameter values $12a$, $12b$, $12c$, $12d$, and $12e$ may be a consuming time duration, a temperature setting, a brightness setting of this type of appliance, and/or any other information related to the appliance in use. For purpose of further illustration, assume that the appliance efficiency values $10a$, $10b$, $10c$, $10d$, and $10e$ are 1, 1.2, 3, 1.8 and 1.5 respectively and that the electricity-consuming parameter values $12a$, $12b$, $12c$, $12d$, and $12e$ are 3.2, 4.2, 2, 2.9 and 2.4 (hours/day) respectively in this embodiment. It should be appreciated that the aforesaid numerical values of the appliance efficiency values $10a$, $10b$, $10c$, $10d$, and $10e$ and the electricity-consuming parameter values $12a$, $12b$, $12c$, $12d$, and $12e$ are only for purpose of illustration rather than to limit the scope of the present invention.

The processing unit 13 generates a plurality of first temporary values to be comprised in a first temporary matrix by multiplying the appliance efficiency value of each of the users with the electricity-consuming parameter value of each of the users individually. Specifically, the processing unit 13 multiplies the appliance efficiency value 10*a* of the first user with the electricity-consuming parameter values 12*a*, 12*b*, 12*c*, 12*d*, and 12*e* individually to generate five first temporary values. These five first temporary values may be considered as a first row of the first temporary matrix. Then, the processing unit 13 multiplies the appliance efficiency value 10*b* of the second user with the electricity-consuming parameter values 12*a*, 12*b*, 12*c*, 12*d*, and 12*e* individually to generate another five first temporary values. These five first temporary values may be considered as a second row of the first temporary matrix. The processing unit 13 repeats the aforesaid operations until the appliance efficiency values of all the users have been multiplied with the electricity-consuming parameter value of each of the users individually. After the aforesaid operations are accomplished, the first temporary matrix $T_1$ generated by the processing unit 13 and the first temporary values comprised therein are as follows.

$$T_1 = \begin{bmatrix} 3.2 & 4.2 & 2 & 2.9 & 2.4 \\ 3.84 & 5.04 & 2.4 & 3.48 & 2.88 \\ 9.6 & 12.6 & 6 & 8.7 & 7.2 \\ 5.76 & 7.56 & 3.6 & 5.22 & 4.32 \\ 4.8 & 6.3 & 3 & 4.35 & 3.6 \end{bmatrix}$$

The first row of the above first temporary matrix $T_1$ may be construed as the power that would be consumed if the appliance of the first user operates with the electricity-consuming parameter values 12*a*, 12*b*, 12*c*, 12*d*, and 12*e* of the first, the second, the third, the fourth, and the five users. The second row of the above first temporary matrix $T_1$ may be construed as the power that would be consumed if the appliance of the second user operates with the electricity-consuming parameter values 12*a*, 12*b*, 12*c*, 12*d*, and 12*e* of the first, the second, the third, the fourth and the five users. The meanings of other rows of the first temporary matrix $T_1$ can be appreciated in the similar way.

As can be known from the aforesaid descriptions, each row of the first temporary matrix $T_1$ may be construed as corresponding to the appliance efficiency value of one of the users (that is, the first row corresponds to the appliance efficiency value of the first user, the second row corresponds to the appliance efficiency value of the second user, and so on). Each column of the first temporary matrix $T_1$ may be construed as corresponding to the electricity-consuming parameter value of one of the users (that is, the first column of the first temporary matrix $T_1$ corresponds to the electricity-consuming parameter value of the first user, the second column corresponds to the electricity-consuming parameter value of the second user, and so on).

Then, the processing unit 13 generates a power saving matrix by using the first temporary values comprised in the first temporary matrix. For example, the processing unit 13 executes the following operations for the appliance efficiency value of each of the users (i.e., for each row of the first temporary matrix): (a) selecting the first temporary value of which the electricity-consuming parameter value corresponds to the user as a reference value from the first temporary values corresponding to the appliance efficiency value, (b) subtracting each of the first temporary values corresponding to the appliance efficiency value from the reference value, and (c) updating the first temporary values that are negative to be zero. Afterwards, the processing unit 13 generates the power saving matrix from the first temporary values.

Take the first temporary matrix $T_1$ as an example. For the first row (i.e., for the appliance efficiency value 10*a* of the first user), the processing unit 13 selects the first temporary value corresponding to the first user as a reference value (i.e., selects the first temporary value having a value of 3.2 as the reference value) from the corresponding first temporary values (i.e., 3.2, 4.2, 2, 2.9 and 2.4). Then, the processing unit 13 subtracts each of the first temporary values (i.e., 3.2, 4.2, 2, 2.9 and 2.4) from the reference value (i.e., 3.2). Specifically, the processing unit 13 subtracts each of the first temporary values from the reference value individually to update the first temporary values to be 0, −1, 1.2, 0.3 and 0.8.

Then, for the second row (i.e., for the appliance efficiency value 10*b* of the second user), the processing unit 13 selects the first temporary value corresponding to the second user as a reference value (i.e., selects the first temporary value having a value of 5.04 as the reference value) from the corresponding first temporary values (i.e., 3.84, 5.04, 2.4, 3.48 and 2.88). Then, the processing unit 13 subtracts each of the first temporary values (i.e., 3.84, 5.04, 2.4, 3.48 and 2.88) from the reference value (i.e., 5.04). Specifically, the processing unit 13 subtracts each of the first temporary values from the reference value individually to update the first temporary values to be 1.2, 0, 2.64, 1.56 and 2.16. The processing unit 13 also executes similar operations for the rest rows of the first temporary matrix $T_1$. After the aforesaid operations are accomplished by the processing unit 13, the first temporary values comprised in the first temporary matrix $T_1$ are updated to be as follows.

$$T_1 = \begin{bmatrix} 0 & -1 & 1.2 & 0.3 & 0.8 \\ 1.2 & 0 & 2.64 & 1.56 & 2.16 \\ -3.6 & -6.6 & 0 & -2.7 & -1.2 \\ -0.54 & -2.34 & 1.62 & 0 & 0.9 \\ -1.2 & -2.7 & 0.6 & -0.75 & 0 \end{bmatrix}$$

In the above first temporary matrix $T_1$, the negative ones of the first temporary values indicate that more power would be consumed and thus more electricity charge would be paid if the appliance of the user operates with the electricity-consuming parameter values of other users. Taking the first temporary value in the fourth row and the second column of the first temporary matrix $T_1$ (i.e., −2.34) as an example, it indicates that more power (the value of which is −2.34) would be consumed if the appliance of the fourth user (which has the appliance efficiency value 10*d*) operates with the electricity-consuming parameter value 12*b* of the second user. As can be known from this, a negative first temporary value indicates that the electricity consumption behavior change mode corresponding to this first temporary value is not worth recommending. In this embodiment, the processing unit 13 updates the negative first temporary values to be zero and takes the updated first temporary values as matrix elements comprised in the power saving matrix. The power saving matrix S and the matrix elements comprised therein of this embodiment are as follows.

$$S = \begin{bmatrix} 0 & 0 & 1.2 & 0.3 & 0.8 \\ 1.2 & 0 & 2.64 & 1.56 & 2.16 \\ 0 & 0 & 0 & 0 & 0 \\ 0 & 0 & 1.62 & 0 & 0.9 \\ 0 & 0 & 0.6 & 0 & 0 \end{bmatrix}$$

On the other hand, the processing unit 13 generates a plurality of second temporary values to be comprised in a second temporary matrix by subtracting the electricity-consuming parameter value of each of the users from the electricity-consuming parameter value of each of the users individually. Specifically, the processing unit 13 subtracts the electricity-consuming parameter values 12a, 12b, 12c, 12d, and 12e from the electricity-consuming parameter value 12a of the first user individually to generate five second temporary values. These five second temporary values may be considered as a first row of the second temporary matrix. Then, the processing unit 13 subtracts the electricity-consuming parameter values 12a, 12b, 12c, 12d, and 12e from the electricity-consuming parameter value 12b of the second user individually to generate another five second temporary values. These five second temporary values may be considered as a second row of the second temporary matrix. The processing unit 13 repeats the aforesaid operations until the electricity-consuming parameter values of all the users have been subtracted by the electricity-consuming parameter value of each of the users. After the aforesaid operations are accomplished, the second temporary matrix $T_2$ generated by the processing unit 13 and the second temporary values comprised therein are as follows.

$$T_2 = \begin{bmatrix} 0 & -1 & 1.2 & 0.3 & 0.8 \\ 1 & 0 & 2.2 & 1.3 & 1.8 \\ -1.2 & -2.2 & 0 & -0.9 & -0.4 \\ -0.3 & -1.3 & 0.9 & 0 & 0.5 \\ -0.8 & -1.8 & 0.4 & -0.5 & 0 \end{bmatrix}$$

The first row of the above second temporary matrix $T_2$ may be construed as a change degree (which may also be construed as a changing willingness) for the first user to operate the appliance with the electricity-consuming parameter values 12a, 12b, 12c, 12d, and 12e of the first, the second, the third, the fourth and the five users. The second row of the above second temporary matrix $T_2$ may be construed as a change degree (which may also be construed as a changing willingness) for the second user to operate the appliance with the electricity-consuming parameter values 12a, 12b, 12c, 12d, and 12e of the first, the second, the third, the fourth and the five users. The meanings of other rows of the second temporary matrix $T_2$ can be appreciated in the same way.

A greater second temporary value indicates a larger change degree and thus a lower changing willingness of the user. Furthermore, a negative second temporary value indicates that more power would be consumed and thus more electricity charge would be paid in the corresponding change mode. Taking the second temporary value in the fourth row and the second column of the second temporary matrix $T_2$ (i.e., −1.3) as an example, it indicates that if the fourth user changes his/her electricity-consuming parameter value 12d (i.e., 2.9 hours/day) into the electricity-consuming parameter value 12b of the second user (i.e., 4.2 hours/day), then the consuming time duration becomes longer and thus more power would be consumed. As can be known from this, a negative second temporary value indicates that the electricity consumption behavior change mode corresponding to this second temporary value is not worth recommending.

Then, the processing unit 13 generates a changing willingness matrix by using the second temporary values. As described above, a negative second temporary value indicates that the electricity consumption behavior change mode corresponding to this second temporary value is not worth recommending. Therefore, in this embodiment, the negative second temporary values are updated to be zero and the updated second temporary values are taken as the matrix elements comprised in the changing willingness matrix. The changing willingness matrix C and the matrix elements comprised therein of this embodiment are as follows.

$$C = \begin{bmatrix} 0 & 0 & 1.2 & 0.3 & 0.8 \\ 1 & 0 & 2.2 & 1.3 & 1.8 \\ 0 & 0 & 0 & 0 & 0 \\ 0 & 0 & 0.9 & 0 & 0.5 \\ 0 & 0 & 0.4 & 0 & 0 \end{bmatrix}$$

It should be appreciated that the aforesaid calculating process of generating the changing willingness matrix by using the second temporary values is only for purpose of illustration rather than to limit the scope of the present invention. As an example, in other implementations, the processing unit 13 may take absolute values of the second temporary values and take the absolute values of the second temporary values as the matrix elements of the changing willingness matrix. As another example, the processing unit 13 may also firstly take the absolute values of the second temporary values, then generate a third temporary value by executing an operation (e.g., a square operation) on each of the absolute values of the second temporary values, and take the third temporary values as the matrix elements of the changing willingness matrix.

Then, the processing unit 13 calculates a transform probability matrix by using the power saving matrix and the changing willingness matrix. For example, the processing unit 13 may add a preset value (e.g., 0.1) to each of a plurality of matrix elements comprised in the changing willingness matrix to avoid a case of infinity during the subsequent division process. The power saving matrix is divided by the updated changing willingness matrix to generate a third temporary matrix. Then, each row of the third temporary matrix is normalized to have a sum value of one. The normalized third temporary matrix is taken as the transform probability matrix.

For the power saving matrix S and the changing willingness matrix C described above, the processing unit 13 adds 0.1 to each of the matrix elements of the changing willingness matrix C firstly. Then the power saving matrix is divided by the changing willingness matrix to generate the transform probability matrix. The resultant transform probability matrix M is as follows.

$$M = \begin{bmatrix} 0.036206 & 0.036206 & 0.33421 & 0.271546 & 0.321832 \\ 0.237678 & 0.021787 & 0.250079 & 0.242771 & 0.247685 \\ 0.2 & 0.2 & 0.2 & 0.2 & 0.2 \\ 0.02924 & 0.02924 & 0.473684 & 0.02924 & 0.438596 \\ 0.0625 & 0.0625 & 0.75 & 0.0625 & 0.0625 \end{bmatrix}$$

After the transform probability matrix is calculated, the processing unit 13 calculates an eigenvalue and an eigenvector of the transform probability matrix. The eigenvalue comprises a plurality of sub-values, and the eigenvector comprises a plurality of sub-vectors. It should be appreciated that how to calculate the eigenvalue and the eigenvector of a matrix is a common knowledge in the art of linear algebra, and thus the calculation principle and process will not be detailed herein. Taking the above transform probability matrix M as an example, the eigenvalue λ, calculated by the processing unit 13 and the sub-values comprised therein are as follows:

$$\lambda = \begin{bmatrix} 1 \\ -0.168 + 0.282i \\ -0.168 - 0.282i \\ -0.157 + 0.042i \\ -0.157 - 0.042i \end{bmatrix}$$

The eigenvector X1 of the transform probability matrix M calculated by the processing unit 13 comprises a plurality of sub-vectors, i.e., $X = [X_1\ X_2\ X_3\ X_4\ X_5]$. Each of the sub-vectors has a value as follows:

$$X_1 = \begin{bmatrix} -0.25 \\ -0.21 \\ -0.77 \\ -0.31 \\ -0.45 \end{bmatrix}$$

$$X_2 = \begin{bmatrix} -0.294497675963229 - 0.141212687905887i \\ -0.152125476649729 - 0.342150148504350i \\ 0.719378237586741 + 0.000000000000000i \\ -0.277073049876165 + 0.096753459298049i \\ 0.00431796490238201 + 0.386609377112188i \end{bmatrix}$$

$$X_3 = \begin{bmatrix} -0.24497675963229 + 0.141212687905887i \\ -0.152125476649729 + 0.342150148504350i \\ 0.719378237586741 + -0.000000000000000i \\ -0.277073049876165 - 0.096753459298049i \\ 0.00431796490238201 - 0.386609377112188i \end{bmatrix}$$

$$X_4 = \begin{bmatrix} -0.186957664045064 - 0.225382450674066i \\ 0.664978242067344 + 0.000000000000000i \\ -0.607584493585651 + 0.195442101284445i \\ -0.0292286384887427 + 0.153135633056687i \\ 0.158792554052113 - 0.123195283667065i \end{bmatrix}, \text{ and}$$

$$X_5 = \begin{bmatrix} -0.186957664045064 + 0.225382450674066i \\ 0.664978242067344 + -0.000000000000000i \\ -0.607584493585651 - 0.195442101284445i \\ -0.0292286384887427 - 0.153135633056687i \\ 0.158792554052113 + 0.123195283667065i \end{bmatrix}.$$

Then, the processing unit 13 recommends an electricity consumption behavior according to the eigenvalue and the eigenvector. For example, as the sub-values comprised in the eigenvalue are in one-on-one correspondence with the sub-vectors comprised in the eigenvector, the processing unit 13 may select the sub-vector whose corresponding sub-value is one and recommend the electricity consumption behavior according to the sub-vector. In the aforesaid particular example, the first sub-value of the eigenvalue λ is one and corresponds to the first sub-vector $X_1$. Therefore, the processing unit 13 recommends the electricity consumption behavior according to the contents of the sub-vector $X_1$.

Further speaking, the processing unit 13 may take an absolute value of each of the vector elements comprised in the sub-vector $X_1$. The absolute values are ranked from the largest to the smallest to present ranking positions of the respective users. Specifically, the absolute values of the vector elements comprised in the sub-vector $X_1$ are ranked from the largest to the smallest as 0.77, 0.45, 0.31, 0.25, and 0.21. As can be known from this, the electricity consumption ranking is in the sequence of the third user corresponding to 0.77, the fifth user corresponding to 0.45, the fourth user corresponding to 0.31, the first user corresponding to 0.25 and the second user corresponding to 0.21.

Then, the processing unit 13 may recommend electricity consumption behaviors to different users in this order. For example, the processing unit 13 may provide each of the users with the electricity consumption mode of a user ranking immediately ahead for reference. Taking the aforesaid data as an example, the processing unit 13 may provide the electricity consumption mode of the user ranking fourth (i.e., the first user) to the second user ranking fifth for reference. Since the processing unit 13 provides the user with the electricity consumption mode of another user having a close ranking position for recommendation, the electricity consumption mode of the user only needs to change to a small extent. This can increase the changing willingness of the user.

It should be appreciated that since the sub-vector $X_1$ presents ranking positions of all the users, the processing unit 13 may also recommend electricity consumption behaviors to the respective users for reference in other ways according to the electricity consumption ranking in other implementations. For example, a certain user is provided with the electricity consumption modes of all the users ranking ahead for reference.

The apparatus 1 for recommending an electricity consumption behavior of this embodiment may be used with other applications to recommend an electricity consumption behavior according to the user's needs. For example, the user may firstly predict the future electricity consumption amount and calculate the corresponding electricity charge according to the predicted value. If the future electricity charge is very likely to exceed the budget, then the aforesaid operations are executed by the apparatus 1 to obtain a recommended electricity consumption behavior.

As can be known from the above descriptions, in this embodiment, a power saving matrix and a changing willingness matrix are calculated by using appliance efficiency values and electricity-consuming parameter values of a plurality of users. Then, a transform probability matrix is calculated by using the power saving matrix and the changing willingness matrix. An electricity consumption behavior is recommended according to an eigenvalue and an eigenvector of the transform probability matrix. Ranking positions of all the users can be known from the eigenvalue and the eigenvector so that at least different electricity consumptions behaviors are recommended to different users to tell the users how to save power by changing their electricity consumption modes.

Figure 2A:
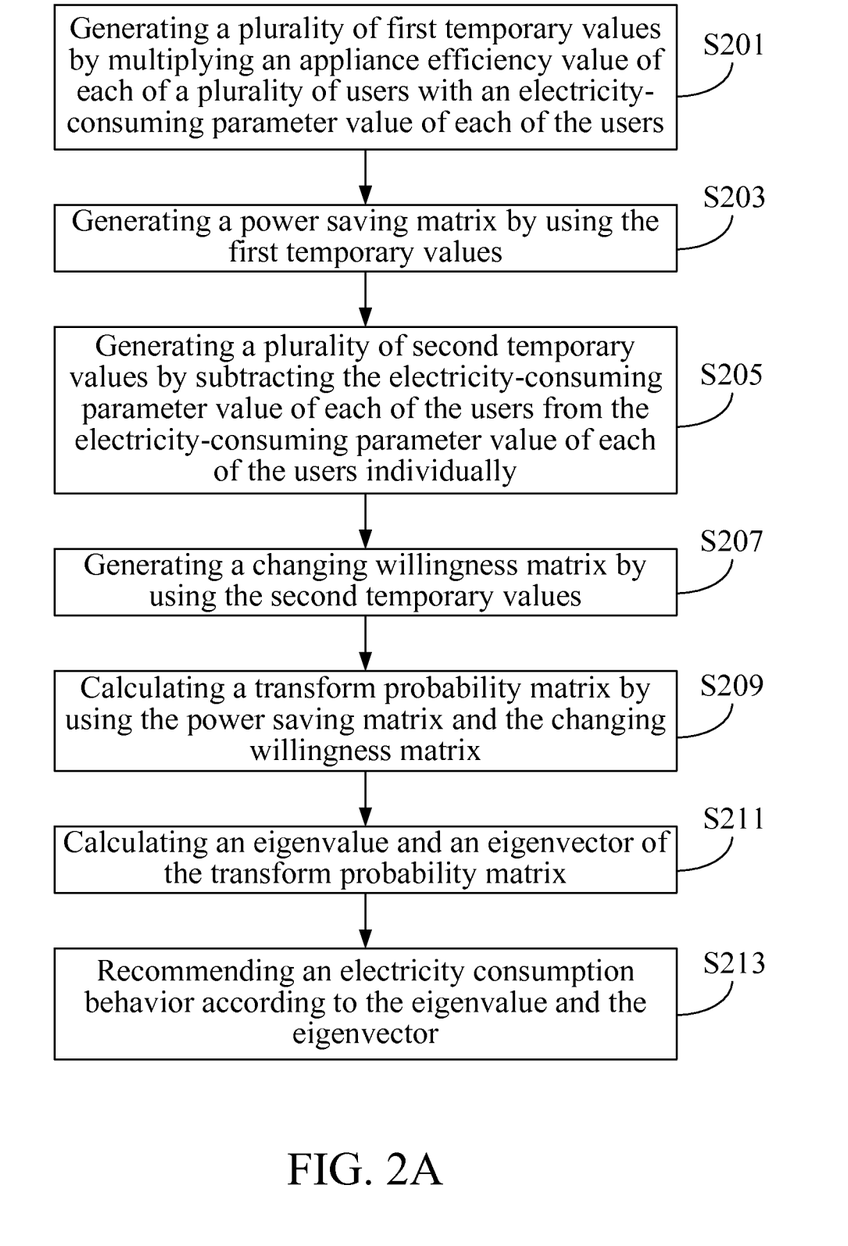
FIG. 2A is a flowchart diagram of a method for recommending an electricity consumption behavior according to a second embodiment of the present invention.
Figure 2B:
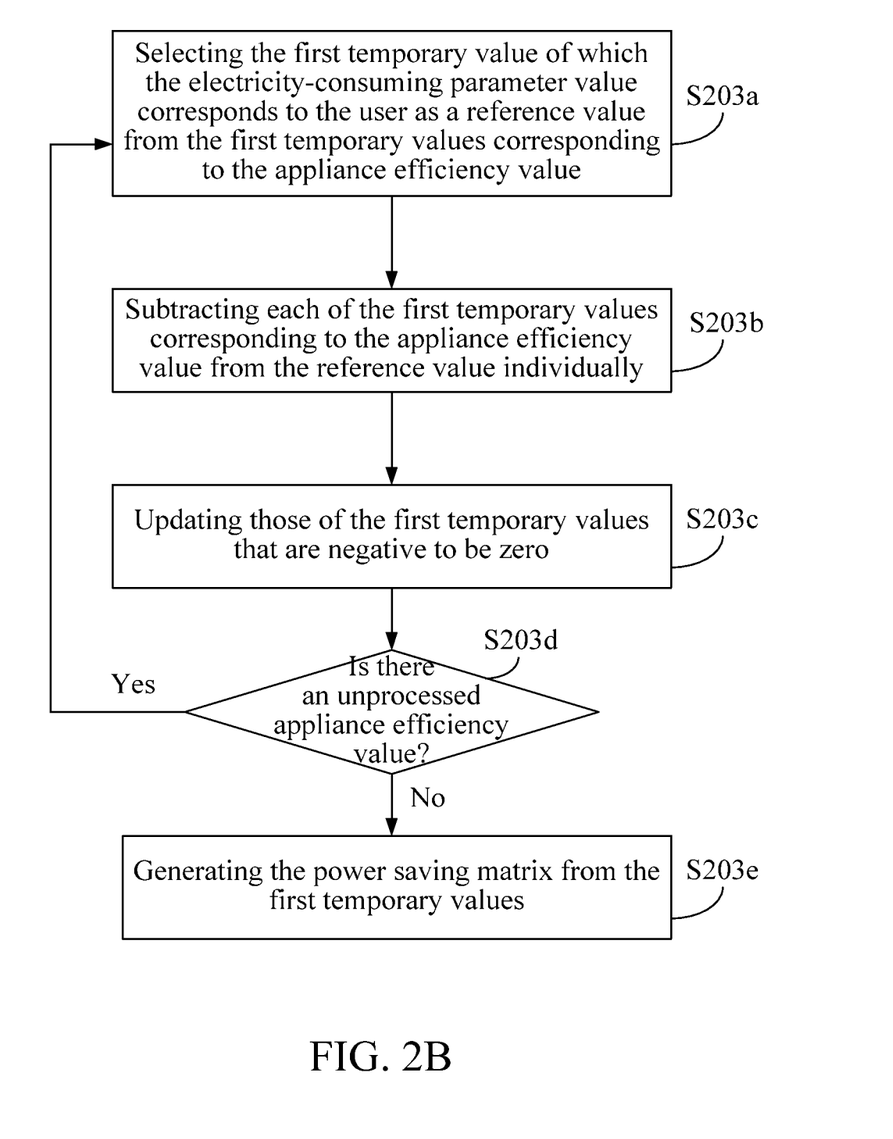
FIG. 2B is a part of the flowchart diagram of the method for recommending an electricity consumption behavior according to a second embodiment of the present invention.

A second embodiment of the present invention is a computer-implemented method for recommending an electricity consumption behavior, a flowchart diagram of which is depicted in FIG. 2A and FIG. 2B. The method for recommending an electricity consumption behavior can be executed, for example, by the apparatus 1 for recommending an electricity consumption behavior of the first embodiment. The method for recommending an electricity consumption behavior can provide services to a plurality of users. Subsequent operations are executed by using an appliance efficiency value and an electricity-consuming parameter value of each of the users. Each of the aforesaid electricity-consuming parameter values is one of or a combination of a consuming time duration, a temperature setting and a brightness setting.

Firstly, step S201 is executed to generate a plurality of first temporary values by multiplying the appliance efficiency value of each of the users with the electricity-consuming parameter value of each of the users. Then, step S203 is executed to generate a power saving matrix by using the first temporary values. For example, in the step S203, steps S203a, S203b, S203c, and S203d may be executed for the appliance efficiency value of each of the users, and then step S203e is executed. In the step S203a, the first temporary value of which the electricity-consuming parameter value corresponds to the user is selected as a reference value from the first temporary values corresponding to one of the appliance efficiency values. In the step S203b, each of the first temporary values corresponding to the appliance efficiency value is subtracted from the reference value individually. In the step S203c, the first temporary values that are negative are updated to be zero. Afterwards, the step S203d is executed to determine whether there is an unprocessed appliance efficiency value. If there is an unprocessed appliance efficiency value, then the steps S203a, S203b, S203c and S203d are executed again to process other unprocessed appliance efficiency values. If the step S203d determines that all the appliance efficiency values have been processed, then the step S203e is executed to generate the power saving matrix from the first temporary values.

Subsequent to the step S203, step S205 is executed to generate a plurality of second temporary values by subtracting the electricity-consuming parameter value of each of the users from the electricity-consuming parameter value of each of the users individually. Afterwards, step S207 is executed to generate a changing willingness matrix by using the second temporary values. As an example, the second temporary values that are negative may be updated to be zero and the changing willingness matrix is generated from the second temporary values in the step S207. As another example, those negative of the second temporary values may also be updated to be zero in the step S207. A third temporary value is generated by executing an operation on each of the updated second temporary values respectively. Then, the changing willingness matrix is generated from the third temporary values. It should be appreciated that in other implementations, the steps S205 and S207 may be executed before the steps S201 and S203 in the method for recommending an electricity consumption behavior.

Then, step S209 is executed to calculate a transform probability matrix by using the power saving matrix and the changing willingness matrix. For example, in the step S209, a preset value may be added to each of a plurality of matrix elements comprised in the changing willingness matrix, and the transform probability matrix is generated by dividing the power saving matrix by the changing willingness matrix. Afterwards, in step S211, an eigenvalue and an eigenvector of the transform probability matrix are calculated. Then, in step S213, an electricity consumption behavior is recommended according to the eigenvalue and the eigenvector.

For example, the eigenvalue of the transform probability matrix comprises a plurality of sub-values, and the eigenvector of the transform probability matrix comprises a plurality of sub-vectors. The sub-values are in one-on-one correspondence with the sub-vectors. Therefore, in the step S213, the sub-vector whose corresponding sub-value is one may be selected and the electricity consumption behavior is recommended according to the sub-vector. Further speaking, if the sub-vector whose corresponding sub-value is one is taken as a selected vector, then absolute values of the respective vector elements comprised in the selected vector can be taken. The absolute values are ranked from the largest to the smallest to present ranking positions of the respective users. Therefore, the method for recommending an electricity consumption behavior can recommend electricity consumption behaviors to different users according to the electricity consumption ranking. For example, the method for recommending an electricity consumption behavior may provide each of the users with the electricity consumption mode of the user ranking immediately ahead for reference. Since the two users rank closely, the electricity consumption mode of the user only needs to change to a small extent. This can increase the changing willingness of the user.

The method for recommending an electricity consumption behavior of this embodiment may be used with other applications to recommend an electricity consumption behavior according to the user's needs. For example, the user may firstly predict the future electricity consumption amount and calculate the accompanied electricity charge according to the predicted value. If the future electricity charge is very likely to exceed the budget, then the aforesaid operations are executed in the method for recommending an electricity consumption behavior to obtain at least one recommended electricity consumption behavior.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

Moreover, the method for recommending an electricity consumption behavior of the second embodiment can be implemented by a computer program having a plurality of codes. The computer program is stored in a non-transitory computer readable storage medium. When the codes are loaded into an electronic apparatus, the computer program executes the method for recommending an electricity consumption behavior described in the second embodiment. The aforesaid non-transitory computer readable storage medium may be a read only memory (ROM), a flash memory, a floppy disk, a hard disk, a compact disk, a mobile disk, a magnetic tape, a database accessible to networks, or any other storage media with the same function and well known to those skilled in the art.

According to the above descriptions, the present invention calculates a power saving matrix and a changing willingness matrix by using appliance efficiency values and electricity-consuming parameter values of a plurality of users. Then, a transform probability matrix is calculated by using the power saving matrix and the changing willingness matrix. An electricity consumption behavior is recommended according to an eigenvalue and an eigenvector of the transform probability matrix. Ranking positions of all the users can be known from the eigenvalue and the eigenvector so that at least different electricity consumptions behaviors are recommended to different users to tell the users how to save power by changing their electricity consumption modes.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electricity consumption behavior recommendation apparatus, comprising:
    a storage unit, being stored with an appliance efficiency value and an electricity-consuming parameter value for each of a plurality of users; and
    a processing unit electrically connected to the storage unit, being configured to generate a plurality of first temporary values by multiplying the appliance efficiency value of each of the users with the electricity-consuming parameter value of each of the users individually, generate a power saving matrix by using the first temporary values, generate a plurality of second temporary values by subtracting the electricity-consuming parameter value of each of the users from the electricity-consuming parameter value of each of the users individually, generate a changing willingness matrix by using the second temporary values, calculate a transform probability matrix by using the power saving matrix and the changing willingness matrix, calculate an eigenvalue and an eigenvector of the transform probability matrix, determine a ranking position of each of the users according to the eigenvalue and the eigenvector, wherein each of the users corresponds to an electricity consumption behavior, wherein the processing unit further recommends different electricity consumption behavior to different users by providing an electricity consumption mode of a first user to a second user ranked behind the first user to tell the second user how to save power by changing an electricity consumption mode of the second user, wherein the electricity consumption mode of the second user is changed based upon the recommended different electricity consumption behavior, and wherein the first user and the second user are comprised in the users.

2. The apparatus for recommending an electricity consumption behavior as claimed in claim 1, wherein the processing unit generates the power saving matrix by the following operations:
    (a) executing the following operations for the appliance efficiency value of each of the users:
        selecting the first temporary value of which the electricity-consuming parameter value corresponds to the user as a reference value from the first temporary values corresponding to the appliance efficiency value,
        subtracting each of the first temporary values corresponding to the appliance efficiency value from the reference value individually, and
        updating the first temporary values that are negative to be zero, and
    (b) generating the power saving matrix from the first temporary values.

3. The apparatus for recommending an electricity consumption behavior as claimed in claim 1, wherein each of the electricity-consuming parameter values is one of a consuming time duration, a temperature setting, a brightness setting, and a combination thereof.

4. The apparatus for recommending an electricity consumption behavior as claimed in claim 1, wherein the processing unit updates the second temporary values that are negative to be zero and generates the changing willingness matrix from the second temporary values.

5. The apparatus for recommending an electricity consumption behavior as claimed in claim 1, wherein the processing unit takes absolute values of the second temporary values and generates the changing willingness matrix from the absolute values of the second temporary values.

6. The apparatus for recommending an electricity consumption behavior as claimed in claim 1, wherein the processing unit takes absolute values of the second temporary values, generates a third temporary value by executing an operation on each of the absolute values of the second temporary values, and generates the changing willingness matrix from the third temporary values.

7. The apparatus for recommending an electricity consumption behavior as claimed in claim 1, wherein the processing unit adds a preset value to each of a plurality of matrix elements comprised in the changing willingness matrix, and generates the transform probability matrix by dividing the power saving matrix by the changing willingness matrix.

8. The apparatus for recommending an electricity consumption behavior as claimed in claim 1, wherein the eigenvalue comprises a plurality of sub-values, the eigenvector comprises a plurality of sub-vectors, the sub-values are in one-on-one correspondence with the sub-vectors, and the processing unit further selects the sub-vector whose corresponding sub-value is one and recommends the electricity consumption behavior according to the sub-vector.

9. A computer-implemented method for recommending an electricity consumption behavior, comprising the steps of:
    (a) generating a plurality of first temporary values by multiplying an appliance efficiency value of each of a plurality of users with an electricity-consuming parameter value of each of the users;
    (b) generating a power saving matrix by using the first temporary values;
    (c) generating a plurality of second temporary values by subtracting the electricity-consuming parameter value of each of the users from the electricity-consuming parameter value of each of the users individually;
    (d) generating a changing willingness matrix by using the second temporary values;
    (e) calculating a transform probability matrix by using the power saving matrix and the changing willingness matrix;
    (f) calculating an eigenvalue and an eigenvector of the transform probability matrix;
    (g) determining a ranking position of each of the users according to the eigenvalue and the eigenvector;
    (h) recommending the electricity consumption behavior by providing an electricity consumption mode of a first user to a second user ranked behind the first user to tell the second user how to save power by changing an electricity consumption mode of the second user, wherein the first user and the second user are comprised in the users; and
    (i) changing the electricity consumption mode of the second user based upon the recommended electricity consumption behavior.

10. The method for recommending an electricity consumption behavior as claimed in claim 9, wherein the step (b) comprises the steps of:
   executing the following operations for the appliance efficiency value of each of the users:
      selecting the first temporary value of which the electricity-consuming parameter value corresponds to the user as a reference value from the first temporary values corresponding to the appliance efficiency value;
      subtracting each of the first temporary values corresponding to the appliance efficiency value from the reference value individually; and
      updating the first temporary values that are negative to be zero; and
   generating the power saving matrix from the first temporary values.

11. The method for recommending an electricity consumption behavior as claimed in claim 9, wherein each of the electricity-consuming parameter values is one of a consuming time duration, a temperature setting, a brightness setting, and a combination thereof.

12. The method for recommending an electricity consumption behavior as claimed in claim 9, wherein the step (d) includes updating the second temporary values that are negative to be zero and generating the changing willingness matrix from the second temporary values.

13. The method for recommending an electricity consumption behavior as claimed in claim 9, wherein the step (d) includes taking absolute values of the second temporary values and generating the changing willingness matrix from the absolute values of the second temporary values.

14. The method for recommending an electricity consumption behavior as claimed in claim 9, wherein the step (d) comprises the steps of:
   taking absolute values of the second temporary values;
   generating a third temporary value by executing an operation on each of the absolute values of the second temporary values; and
   generating the changing willingness matrix from the third temporary values.

15. The method for recommending an electricity consumption behavior as claimed in claim 9, wherein the step (e) includes adding a preset value to each of a plurality of matrix elements comprised in the changing willingness matrix, and generating the transform probability matrix by dividing the power saving matrix by the changing willingness matrix.

16. The method for recommending an electricity consumption behavior as claimed in claim 9, wherein the eigenvalue comprises a plurality of sub-values, the eigenvector comprises a plurality of sub-vectors, the sub-values are in one-on-one correspondence with the sub-vectors, and the step (g) includes selecting the sub-vector whose corresponding sub-value is one and recommending the electricity consumption behavior according to the sub-vector.

17. A non-transitory computer readable storage medium, having a computer program stored therein, the computer program executes a method for recommending an electricity consumption behavior, the medium comprising:
   a code A for generating a plurality of first temporary values by multiplying an appliance efficiency value of each of a plurality of users with an electricity-consuming parameter value of each of the users;
   a code B for generating a power saving matrix by using the first temporary values;
   a code C for generating a plurality of second temporary values by subtracting the electricity-consuming parameter value of each of the users from the electricity-consuming parameter value of each of the users individually;
   a code D for generating a changing willingness matrix by using the second temporary values;
   a code E for calculating a transform probability matrix by using the power saving matrix and the changing willingness matrix;
   a code F for calculating an eigenvalue and an eigenvector of the transform probability matrix;
   a code G for determining a ranking position of each of the users according to the eigenvalue and the eigenvector; and
   a code H for recommending the electricity consumption behavior by providing an electricity consumption mode of a first user to a second user ranked behind the first user to tell the second user how to save power by changing an electricity consumption mode of the second user, wherein the electricity consumption mode of the second user is changed based upon the recommended different electricity consumption behavior, and wherein the first user and the second user are comprised in the users.

* * * * *